US009091481B2

(12) United States Patent
Lankinen

(10) Patent No.: US 9,091,481 B2
(45) Date of Patent: Jul. 28, 2015

(54) FLUIDIZED BED REACTOR ARRANGEMENT

(75) Inventor: Pentti Lankinen, Varkaus (FI)

(73) Assignee: AMEC FOSTER WHEELER ENERGIA OY, Espoo (FI)

( * ) Notice: Subject to any disclaimer, the term of this patent is extended or adjusted under 35 U.S.C. 154(b) by 269 days.

(21) Appl. No.: 13/574,292

(22) PCT Filed: Feb. 18, 2011

(86) PCT No.: PCT/FI2011/050150
§ 371 (c)(1), (2), (4) Date: Aug. 31, 2012

(87) PCT Pub. No.: WO2011/104434
PCT Pub. Date: Sep. 1, 2011

(65) Prior Publication Data
US 2013/0064722 A1 Mar. 14, 2013

(30) Foreign Application Priority Data
Feb. 26, 2010 (FI) .................................... 20105190

(51) Int. Cl.
*B01J 8/18* (2006.01)
*F27B 15/02* (2006.01)
(Continued)

(52) U.S. Cl.
CPC ............... *F27B 15/02* (2013.01); *F01K 23/061* (2013.01); *F22B 29/06* (2013.01); *F22B 31/0007* (2013.01); *F22G 1/02* (2013.01); *F23C 10/10* (2013.01); *F27D 17/004* (2013.01)

(58) Field of Classification Search
CPC ................ B01J 8/00; B01J 8/08; B01J 8/087; B01J 8/18; B01J 8/1836; B01J 8/24; B01J 19/00; B01J 19/24; B01J 2208/00; B01J 2219/32; B01J 2219/33; F28C 3/00; F28C 3/10; F28C 3/12; F28C 3/16; F27B 15/00; F27D 99/00; F27D 99/0001; F27D 99/0061; F27D 99/0066; F28D 13/00; F28D 2021/00; F28D 2021/0019; F28D 2021/0045
USPC .......................... 422/129, 139, 146, 187, 198
See application file for complete search history.

(56) References Cited

U.S. PATENT DOCUMENTS 4,896,717 A 1/1990 Campbell, Jr. et al.
5,332,553 A 7/1994 Hyppanen
(Continued)

FOREIGN PATENT DOCUMENTS

FI 954374 A 12/1994
JP 8-508334 A 9/1996
(Continued)

OTHER PUBLICATIONS

Notification of and International Search Report issued Jun. 29, 2011, and mailed in a communication dated Jun. 30, 2011, in counterpart International Application No. PCT/FI2011/050150.
(Continued)

*Primary Examiner* — Natasha Young
(74) *Attorney, Agent, or Firm* — Fitzpatrick, Cella, Harper & Scinto

(57) ABSTRACT

A fluidized bed reactor arrangement includes a bottom portion and a roof portion. A reaction chamber is defined by at least one side wall extending between the bottom portion and the roof portion. The at least one side wall includes a vertically extending portion having a lower end and a lower portion, which lower portion is inclined in such a manner that a cross section of the reaction chamber decreases towards the bottom portion. A heat exchange chamber, outside of the reaction chamber, is at the lower portion of the at least one side wall. The lower portion of the at least one side wall forms a partition wall between the heat exchange chamber and the reaction chamber. The heat exchange chamber extends from the partition wall to a rear wall of the heat exchange chamber.

12 Claims, 3 Drawing Sheets

(51) Int. Cl.

| | |
|---|---|
| ***F01K 23/06*** | (2006.01) |
| ***F22B 29/06*** | (2006.01) |
| ***F22B 31/00*** | (2006.01) |
| ***F22G 1/02*** | (2006.01) |
| ***F23C 10/10*** | (2006.01) |
| ***F27D 17/00*** | (2006.01) |
| *B01J 8/00* | (2006.01) |
| *B01J 8/08* | (2006.01) |
| *B01J 8/24* | (2006.01) |
| *B01J 19/00* | (2006.01) |
| *B01J 19/24* | (2006.01) |
| *F28C 3/00* | (2006.01) |
| *F28C 3/10* | (2006.01) |
| *F28C 3/12* | (2006.01) |
| *F28C 3/16* | (2006.01) |
| *F27B 15/00* | (2006.01) |
| *F27D 99/00* | (2010.01) |
| *F28D 13/00* | (2006.01) |

(56) References Cited

U.S. PATENT DOCUMENTS

| | | | | |
|---|---|---|---|---|
| 5,341,766 | A | 8/1994 | Hyppanen | |
| 5,345,896 | A | 9/1994 | Hyppanen | |
| 5,406,914 | A | 4/1995 | Hyppanen | |
| 5,425,412 | A | 6/1995 | Hyppanen | |
| 5,476,639 | A | 12/1995 | Hyppanen | |
| 5,522,160 | A | 6/1996 | Hyppanen | |
| 5,533,471 | A * | 7/1996 | Hyppanen | 122/4 D |
| 5,540,894 | A * | 7/1996 | Hyppanen | 422/146 |
| 5,695,130 | A | 12/1997 | Csendes | |
| 5,707,591 | A | 1/1998 | Semedard et al. | |
| 5,772,969 | A | 6/1998 | Hyppanen | |
| 5,826,807 | A | 10/1998 | Csendes | |
| 5,840,258 | A | 11/1998 | Hyppanen | |
| 5,850,977 | A | 12/1998 | Csendes | |
| 6,044,977 | A | 4/2000 | Csendes | |
| 7,094,264 | B2 | 8/2006 | Steer | |
| 2005/0166457 | A1 | 8/2005 | Steer | |

FOREIGN PATENT DOCUMENTS

| | | | |
|---|---|---|---|
| JP | 10-501177 | A | 2/1998 |
| RU | 2 119 119 | C1 | 9/1998 |
| RU | 2 140 823 | C1 | 11/1999 |
| WO | 94/11284 | A1 | 5/1994 |
| WO | 94/22571 | A1 | 10/1994 |
| WO | 96/05469 | A1 | 2/1996 |

OTHER PUBLICATIONS

Written Opinion issued Jun. 29, 2011, and mailed in a communication dated Jun. 30, 2011, in counterpart International Application No. PCT/FI2011/050150.

Finnish Office Action dated Jan. 21, 2011, issued in counterpart Finnish patent application No. 20105190.

International Preliminary Report on Patentability, including Written Opinion, issued Aug. 28, 2012 by the International Bureau of WIPO, and mailed in a communication dated Sep. 7, 2012, in counterpart International Application No. PCT/FI2011/050150.

Japanese Office Action dated Jan. 28, 2014, issued in counterpart Japanese Patent Application No. 2012-554383, with an English translation.

Russian Decision on Grant issued Oct. 5, 2013, in corresponding Russian Patent Application No. 2012140950/20 (066065), with an English translation.

* cited by examiner

FLUIDIZED BED REACTOR ARRANGEMENT

This application is a U.S. national stage application of PCT International Application No. PCT/FI2011/050150, filed Feb. 18, 2011, published as International Publication No. WO 2011/104434 A1, and which claims priority from Finnish patent application number 20105190, filed Feb. 26, 2010.

FIELD OF THE INVENTION

The present invention relates to a fluidized bed reactor arrangement in which a fluidized bed reactor comprises at least a bottom portion, a roof portion and at least one side wall vertically extending between the bottom portion and the roof portion, the side wall being arranged to be inclined at the lower portion thereof in such a manner that the cross section of the reaction chamber of the reactor decreases towards the bottom portion, and which fluidized bed reactor arrangement comprises a heat exchange chamber at the inclined area of the side wall outside of the reaction chamber, and which side wall, extending between the bottom portion and the roof portion and being arranged to be inclined at the lower portion thereof, forms a partition wall between the heat exchange chamber and the reaction chamber, and in which the heat exchange chamber extends from the partition wall to the other side of the plane extending through the side wall.

BACKGROUND OF THE INVENTION

The reactor chamber of the fluidized bed reactor typically comprises an interior that is rectangular of a horizontal cross section, defined by four side walls, a bottom and a roof, in which interior, bed material containing solid material and, for example, fuel is fluidized by means of fluidizing gas, generally, oxygenous, primary gas required for the exothermic chemical reactions taking place in the reaction chamber. The interior, in other words, the reaction chamber, is called a combustion chamber and the reactor a fluidized bed boiler, when a combustion process is performed in the fluidized bed reactor. The side walls of the reaction chamber are typically also provided at least with conduits for fuel feed and feed of secondary air.

The side walls of the reaction chamber are generally fabricated to comprise panels formed of tubes and fins therebetween, whereby the energy released in the chemical reactions of the fuel is used to evaporate the water flowing in the tubes. Superheater surfaces are also often provided in a fluidized bed reactor to further increase the energy content of the steam.

A fluidized bed reactor may be, for example, a circulating fluidized bed reactor or a bubbling bed reactor. Fluidized bed reactors are used in various combustion processes, heat exchange processes, chemical processes, and metallurgical processes. In the combustion processes, components of the fluidized bed may include granular fuels, like coal, coke, lignite, wood, waste or peat, and also, other granular substances, like sand, ash, desulfurizing agents or catalysts.

A characteristic feature of the fluidized bed reactor is the use of solid bed material as process material. The bed material acts as, for example, a temperature stabilizing component in the reaction chamber and binds a considerable amount of heat therein. Bed material can thus also be used for transferring heat from the reaction to the medium. In fluidized bed combustion plants, heat recovery typically takes place in a combustion chamber and in a convection portion by means of heat exchange surfaces, which is arranged downstream of a particle separator in the gas flow. Heat exchange surfaces, such as superheaters, are typically arranged, for example, in a free space in the upper portion of the reaction chamber and in the convection portion subsequent thereto, in order to superheat steam.

In the fluidized bed reactors, it is known per se to use heat exchanger chambers for solids separated from the reaction chamber, i.e., fluidized bed heat exchangers, to which bed material can be supplied from the reaction chamber and cooled in the fluidized bed heat exchanger, for example, prior to recirculating the solids back to bed material of the reaction chamber.

Such fluidized bed heat exchangers typically operate as a so-called bubbling bed. The heat exchange chamber can be arranged either inside the reactor itself or outside thereof. Finnish patent publication No. F1-119916 discloses such a heat exchange chamber arranged inside of the reactor. When the heat exchange chamber is inside the reactor, it is preferably supported by means of the walls and/or the bottom portion of the reactor.

International Publication WO 94/22571 discloses a heat exchange chamber, which is arranged outside of the actual reaction chamber. The heat exchange chamber is arranged in connection with the circulating fluidized bed reactor in such a manner that it participates in a so-called internal circulation for the solids. There, part of the bed material flow inside the reaction chamber is guided directly from the reaction chamber to the heat exchange chamber and, from there, back to the reaction chamber.

U.S. Pat. No. 4,896,717 discloses a heat exchange chamber, which is outside of the actual reactor. Here, the heat exchange chamber is connected to the external circulation for the solids in the circulating fluidized bed reactor, in other words, the solids led to the heat exchange chamber are separated from the gas exiting the reaction chamber.

The support and connection of the heat exchange chamber for solids separated from the reaction chamber to the actual reaction chamber is problematic, especially, in that the heat exchange chamber, horizontally extending far from the reaction chamber, i.e., at least partially outside of the plane of the side wall of the reaction chamber, requires a separate support, which takes up space around the reaction chamber and, thus, diminishes the possibilities to position auxiliary equipment. For example, the heat exchange chamber disclosed in U.S. Pat. No. 4,896,717 extends far under the solids separator, so, in practice, it must be supported very strongly, for example, by supporting it from the cyclone above, whereby only a portion of the mass thereof transfers to the wall of the reaction chamber.

Although the fluidized bed reactors known from the prior art are advantageous as such, a need has arisen recently to provide an improved fluidized bed reactor, in which a heat exchange chamber is connected to the fluidized bed reactor in an improved manner.

Objects of the invention are achieved by means of a fluidized bed reactor arrangement, in which the fluidized bed reactor comprises at least a bottom portion, a roof portion and at least one side wall vertically extending between the bottom portion and the roof portion, which side wall is arranged at the lower portion thereof, inclined in such a manner that the cross section of the reaction chamber of the reactor decreases towards the bottom portion, and which fluidized bed reactor arrangement comprises a heat exchange chamber outside of the reaction chamber at an area of the side wall that is arranged to be inclined, and which side wall, that is inclined at the lower portion thereof extending between the bottom portion and roof portion, forms a partition wall between the heat exchange chamber and the reaction chamber, and in which fluidized bed reactor arrangement, the heat exchange chamber extends from the partition wall to the other side of the plane extending via the side wall. It is characteristic of the invention that the rear wall of the heat exchange chamber is connected to the side wall of the reaction chamber from the upper portion of the rear wall at a connection area in such a manner that the direction thereof aligns with the direction of the side wall at least in the connection area.

Thus, the transfer of the mass forces of the heat exchange chamber to the reaction chamber can be arranged in an advantageous manner by supporting the heat exchange chamber substantially completely to the reaction chamber. Thus, substantially the major portion of the mass forces thereof, preferably, substantially all of the mass forces, are directed to the reaction chamber. Thereby, no such separate support structures are required for the heat exchange chamber, which support the heat exchange chanber to the foundation or to the supporting framework of the fluidized bed arrangement.

SUMMARY OF THE INVENTION

According to one embodiment, the inclined side wall forms a partition between the heat exchange chamber and the reaction chamber. Thus, the supporting forces can be transferred directly to the reaction chamber, and the structure is robust and simple.

According to another embodiment, the plane P extending via the side wall of the fluidized bed reactor aligns at least at the connection area with the plane extending via the rear wall. Thus, a minimal force component deviating from the vertical direction is generated at the connection, and the connection is thus strong.

According to yet another preferred embodiment, the heat exchange chamber comprises end walls in connection with both edges of the rear wall, extending from the connection area to the bottom portion of the heat exchange chamber, and the heat exchange chamber is horizontally arranged only to a portion of the distance between the edges of the side walls of the reaction chamber.

According to yet another embodiment, the fluidized bed reactor arrangement comprises a number of heat exchange chambers within the distance between the edges of the side wall.

According to yet another embodiment, the rear wall of the heat exchange chamber is formed of a membrane structure, and the side wall of the fluidized bed reactor is formed of a membrane structure. The membrane structure of the rear wall is connected to the feed water system of the fluidized bed reactor, and the membrane structure of the side wall is connected to the steaming system of the fluidized bed reactor system. Thereby, the fluidized bed reactor arrangement is preferably a once through boiler.

According to yet another embodiment, the rear wall of the heat exchange chamber is formed of a membrane structure, and the side wall of the fluidized bed reactor is formed of a membrane structure, and in the connection area, a first group of membrane structured tubes is arranged to extend in the inclined side wall and a second group of membrane structured tubes is arranged to extend in the rear wall of the heat exchange chamber.

According to yet another embodiment, the heat exchange chamber has a certain center of gravity, especially, in a situation in which the heat exchange chamber contains a predetermined nominal amount of solids, so-called bed material, therein, which is distributed in a predetermined manner, and that the heat exchange chamber is arranged in such a manner that the center of gravity joins with the plane P.

Other additional features typical of the invention become clear from the accompanying claims and the description of the embodiments shown in the drawings.

BRIEF DESCRIPTION OF THE DRAWINGS

The invention and the operation thereof are described below with reference to the accompanying schematic drawings, in which.

DETAILED DESCRIPTION OF THE PREFERRED EMBODIMENTS

Figure 1:
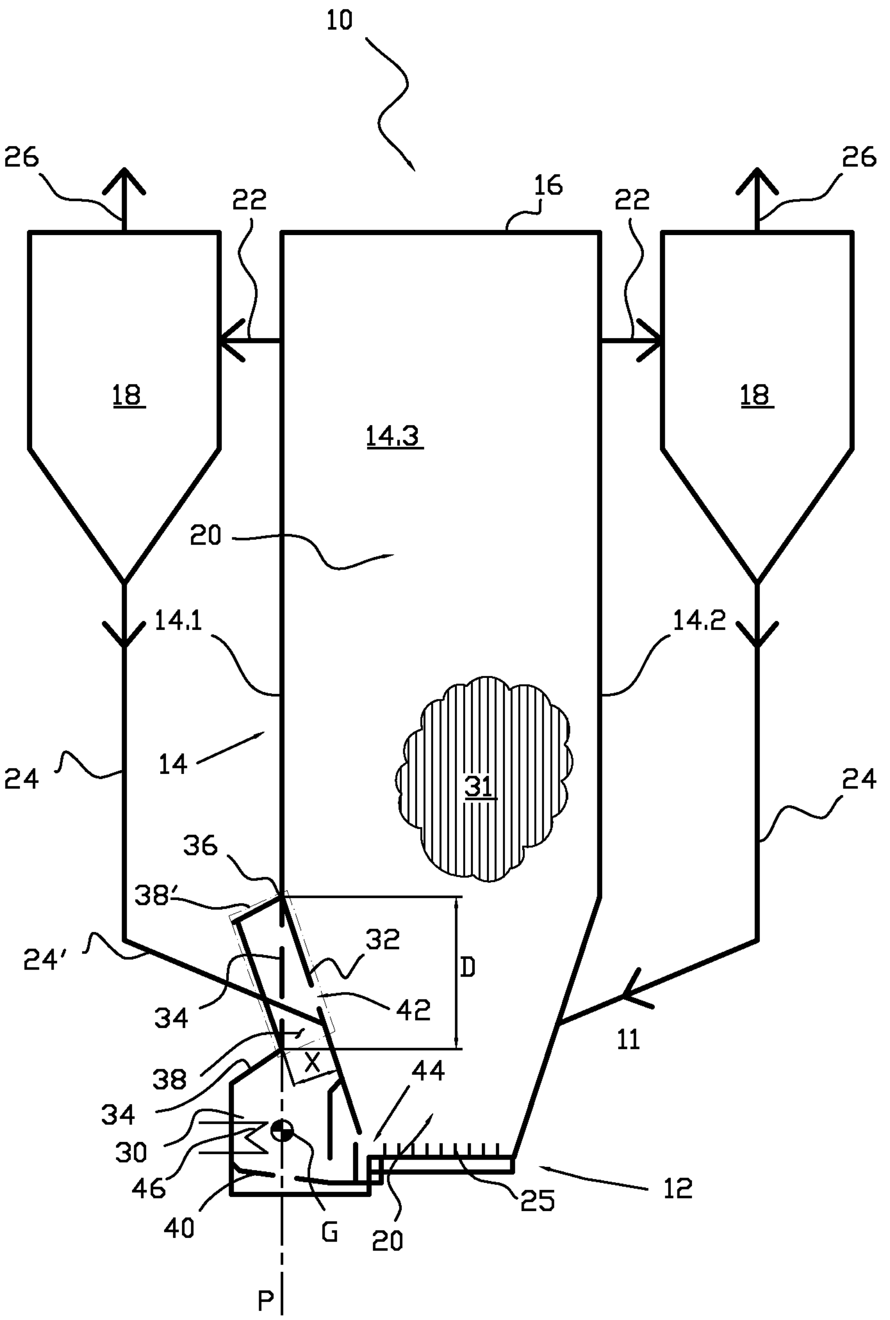
FIG. 1 illustrates an embodiment of a fluidized bed reactor arrangement in accordance with the invention.
Figure 2:
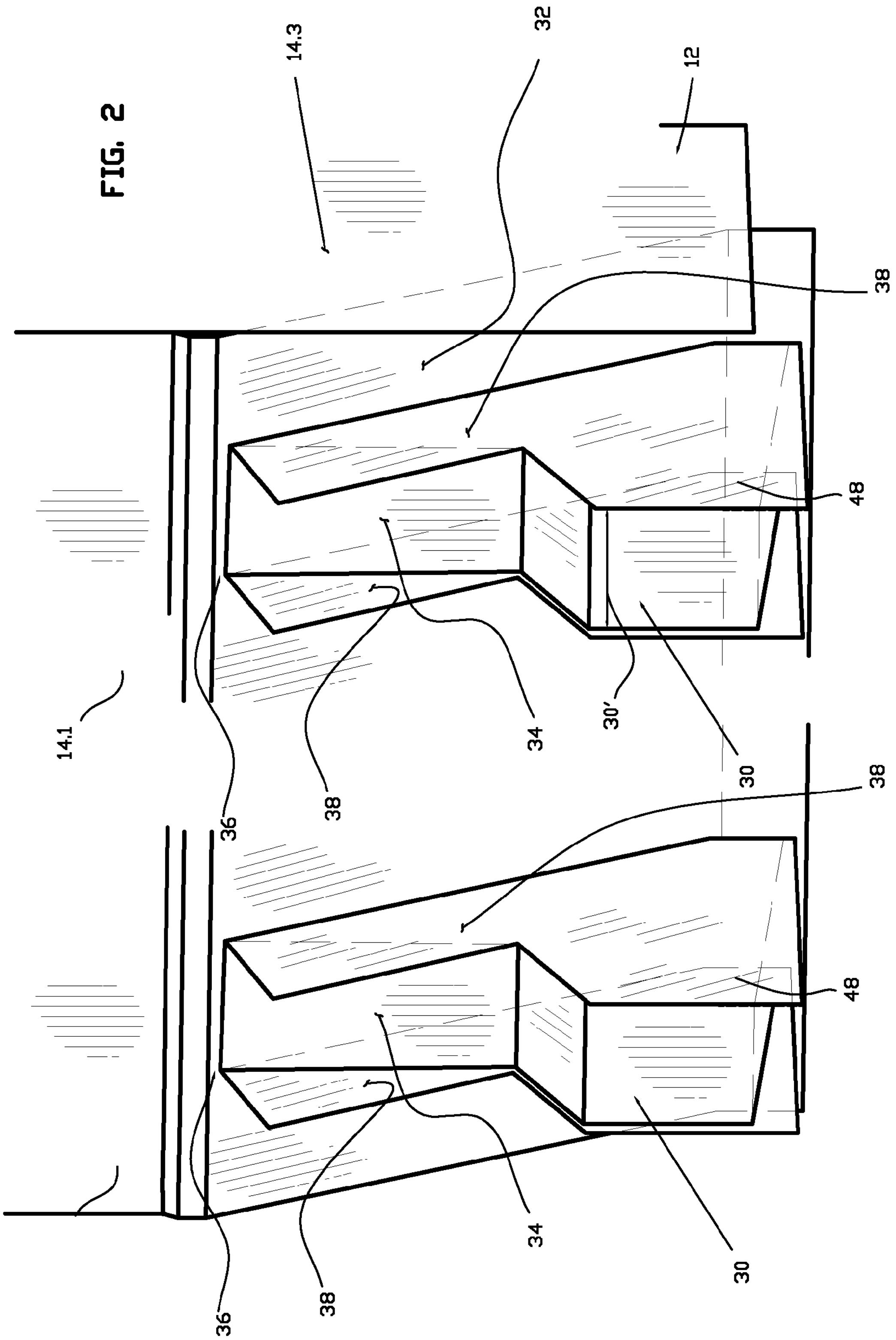
FIG. 2 illustrates an embodiment of a heat exchange chamber of the fluidized bed reactor arrangement in accordance with the invention.

The invention is described below, when applicable, with reference to both FIG. 1 and FIG. 2, in which the same reference numbers are used when referring to corresponding features. FIG. 1 schematically illustrates an embodiment of the fluidized bed reactor arrangement 10 in accordance with the invention. The fluidized bed reactor arrangement 10 comprises a fluidized bed reactor, having, for example, a reactor chamber 20, and a solids separator 18. The fluidized bed reactor is preferably a circulating fluidized bed boiler. FIG. 2 illustrates a heat exchange chamber 30 of a fluidized bed reactor arrangement in the lower portion of the reactor.

A circulating fluidized bed boiler 10 comprises a bottom portion 12, a roof portion 16, and walls 14 extending therebetween. Further, it is clear that the fluidized bed reactor comprises many parts and elements that are not shown here, for the sake of clarity. The bottom portion, the roof portion and the walls 14 form the reaction chamber 20, which is called a furnace in the boiler. The bottom portion 12 also includes a grid 25, through which fluidizing gas is supplied to the reactor. The circulating fluidized bed reactor further comprises a solids separator 18, which is typically a cyclone separator. The solids separator is connected to the reaction chamber from the upper portion thereof, close to the roof portion by means of a connecting channel 22, through which reaction gas and solids can flow to the solids separator 18. In the solids separator 18, solid material is separated from the gas, which solid material may be recirculated, after possible treatment, such as cooling, back to the reaction chamber 20, i.e., to the furnace. For this purpose, the solids separator 18 is connected, for example, to the lower portion of the reaction chamber 20 by means of a return duct 24. The gas, of which solid material has been separated, is led in the system for further treatment through a gas discharge connection 26 of the solids separator 18.

Two opposite side walls 14.1, 14.2 of the fluidized bed reactor are arranged to be inclined in the lower portion of the fluidized bed reactor in such a manner that the side walls approach each other towards the bottom portion 12. Here, the reaction chamber 20 is quadrangular in cross section, so that it is limited, in addition to the side walls, also by end walls, of which only one 14.3 is shown, in this connection. The walls 14 comprise evaporation tubes, which are preferably arranged in such a way that the thermal stress of the reactor against all of them is substantially equal. It has to be noted that, in the figure, the tubes are, for simplicity, shown in lines and the fins connecting, in reality, the tubes, are shown by the distances between the lines. In practice, the walls of the fluidized bed reactor are preferably formed of a membrane structure 31, in which the adjacent flow tubes/channels are connected to each other by means of a plate-structured fin.

The fluidized bed arrangement 10 comprises a heat exchange chamber 30 for cooling solid particles. The heat exchange chamber 30 is arranged in connection with the fluidized bed reactor arrangement 10 in such a manner that it preferably has a common partition wall 32 with the reaction chamber 20. The partition wall 32 is an inclined wall 14.1 in the lower portion of the fluidized bed reactor. The heat exchange chamber 30 also comprises a rear wall 34, joining from the upper portion thereof to a side wall 14.1 of the reaction chamber 20 of the fluidized bed reactor arrangement 10. The rear wall 34 is horizontally parallel with the partition wall 32, and an interior space of the heat exchange chamber 30 is formed therebetween. The connection 36 is realized in such a manner that the mass forces can be transferred by means of the rear wall 34 to the side wall 14.1 of the reactor. In the connection 36 of the heat exchange chamber 30 and side wall 14.1, the direction of the rear wall 34 aligns with the direction of the side wall 14.1. Thereby, the direction of the force transferring to the side wall 14.1 of the reaction chamber 20 via the rear wall 34 is substantially parallel to the side wall 14.1, and the connection 36 is especially strong. The connection 36 can also be described in such a manner that a plane P extends via the side wall 14.1 of the reactor and, thereby, a portion of the rear wall 34 is arranged in such a manner that the plane P extending via the side wall 14.1 joins the plane extending via the portion of the rear wall 34. This portion thus extends to a distance from the connection, whereafter, the rear wall 34 is directed away from the partition wall 32.

The heat exchange chamber 30 comprises end walls 38 in connection with both edges of the rear wall 34 thereof. The rear wall 34 is connected to the end walls 38 at least for a distance D, for which distance, the rear wall 34 is parallel with the side wall 14.1. The end walls are preferably also connected to an inclined side wall, in other words, to the partition wall 32. The end walls are preferably arranged to an area between the connection 36 and bottom portion 12. Thereby, the portion of the side wall 14.1 above the connection 36 remains free of end walls, which enables easier positioning of other devices related to the reactor, such as, in particular, a recycling system for solid material and/or feed devices for gas/fuel.

The heat exchange chamber 30 is provided with a fluidized bed heat exchanger, comprising, at the bottom of the heat exchanger, a supply 40 for supplying fluidizing gas, an inlet 42 and an outlet 44 for solid material, and heat exchange surfaces 46, 48. The heat exchange chamber 30 extends from the partition wall 32 running to the other side via the plane P, whereby it at least partially extends outside of the vertical projection with respect to the reaction chamber 20, in other words, to both sides. Thereby, the rear wall 34 of the heat exchange chamber 30 also comprises at least one inclined portion. The inclination of the rear wall 34 is directed in an opposite direction in relation to the inclination of the partition wall 32. The heat exchange chamber 30 has a certain center of gravity G, especially, in situations in which it contains a nominal amount of solid material, in other words, bed material, therein, distributed in a predetermined manner. The heat exchange chamber 30 is arranged according to a preferred embodiment in such a manner that the center of gravity G joins with the plane P. Thus, the stress against the side wall 14.1 of the reaction chamber 20 in the connection 36 of the rear wall 34 is distributed in an advantageous manner, and the structure is especially strong. The weight of the heat exchange chamber 30 is arranged to distribute, for a long distance, in the side wall 14.1 and in the rear wall 34 of the heat exchange chamber 30, via the end walls of the heat exchange chamber 30. The length D of the portion of the rear wall 34 parallel with the side wall 14.1 at the connection 36 of the rear wall 34 is determined in such a manner that the ratio of the length D to the distance 30' between the end walls 38 in connection with both edges of the rear wall 34 of the heat exchange chamber 30 is at least 0.5. The stress of the heat exchange chamber 30 can thus be distributed in an advantageous manner to the rear wall 34.

The width of the end walls 38 of the heat exchange chamber 30, in the portion 38' joining with plane P, substantially corresponds at least with the perpendicular distance X of the rear wall 34 from the partition wall 32 within a distance D from the connection 36. Thus, the rear wall 34 is connected to the end wall 38 in the area within the edge thereof, whereby the force transferring between the rear wall 34 and the end wall 38 is distributed in an advantageous manner, more evenly than in situations in which the rear wall 34 was connected to the edge of the end wall 38.

When the reactor is used, a fluidized bed is generated in the reactor, preferably, a circulating fluidized bed. In the circulating fluidized bed, a fast fluidized bed of solid particles generates an internal circulation of particles in the reaction chamber, whereby solid particles mainly flow upwards in the central portion of the reaction chamber and downwards along the side walls thereof. Further, solid particles move horizontally, causing the particles to mix efficiently. Mainly finer solid particles are entrained with the gas to the upper portions of the reaction chamber 20, thus flowing downwards along the walls or sideways within the reaction chamber 20, the coarser particles accumulating to the bottom portion of the reaction chamber 20.

Particles of such an internal circulation, flowing down along the side walls, can be guided through openings of the partition wall 32, a so-called inlet 42 to the heat exchange chamber 30. A so-called bubbling bed is arranged inside the heat exchange chamber 30. Solid material is recirculated therefrom back to the fast fluidized bed in the reaction chamber 20 and new solid material is continuously added to the upper portion of the bubbling bed. The heat exchange chamber 30 may also be in connection with the return duct 24' of the solids separator 18. In the fluidized reactor arrangement, it is also possible to have a number of heat exchange chambers, of which a portion of or all can be connected to the internal circulation and/or the return duct of the solids separator 18, as described above.

Figure 3:
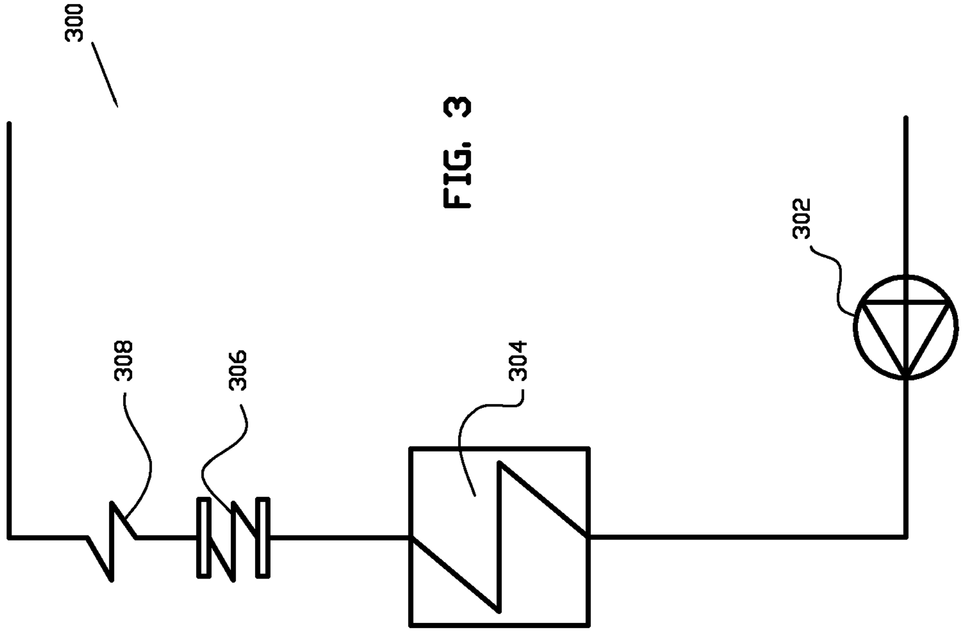
FIG. 3 illustrates a preferred connection in accordance with the invention.

FIG. 3 schematically illustrates a preferred steam circuit coupling 300 of a fluidized bed reactor arrangement for the steam system in accordance with the invention, whereby the fluidized bed reactor arrangement is a once through fluidized bed boiler. Here, a feed water system 304, comprising a feed water heater and positioned downstream of a feed water pump 302 in the steam/water flow direction, comprises a membrane wall of the end walls 38 and/or rear wall 34 of the heat exchange chamber 30. An evaporator system 306 in turn comprises a membrane wall of the reaction chamber 20. A superheater system 308 can comprise, for example, heat exchange surface 46 arranged in the fluidized bed of the heat exchange chamber.

Figure 4:
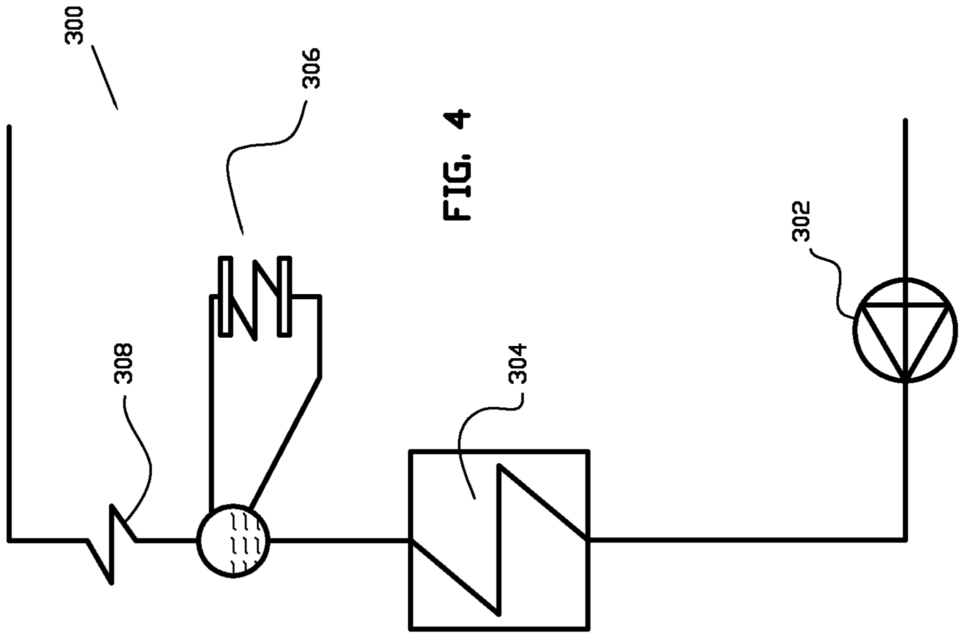
FIG. 4 illustrates another preferred connection in accordance with the invention.

FIG. 4 schematically illustrates another preferred steam circuit coupling 300 of a fluidized bed reactor arrangement for the steam system in accordance with the invention, whereby the fluidized bed reactor arrangement is a natural circulation boiler. In this embodiment, there is a feed water system 304 downstream of the feed water pump 302 in the steam/water flow. The evaporator system 306 of the boiler comprises a membrane wall of both the end walls 38 and/or the rear wall 34 of the heat exchange chamber and a membrane wall of the reaction chamber 20. Also, in this embodiment, the superheater system 308 can comprise, for example, heat exchange surface 46 arranged in the fluidized bed of the heat exchange chamber. Thereby, a first group of the tubes of the membrane structure 31 of the partition wall 32 in the connection area 36 is arranged to extend in the inclined side wall and a second group of the tubes of the membrane structure is arranged to extend in the rear wall 34 of the heat exchange chamber (FIG. 1).

While the invention has been described herein by way of examples in connection with what are, at present, considered to be the most preferred embodiments, it is to be understood that the invention is not limited to the disclosed embodiments, but is intended to cover various combinations or modifications of its features and several other applications included within the scope of the invention as defined in the appended claims. Thus, the heat exchange chamber can also be provided in connection with the return duct 24' of the solids separator. The features disclosed with the embodiments also can be utilized with other embodiments within the scope of the invention, and/or the disclosed features can be combined to form various entities, if such are desired and they are technically feasible.

The invention claimed is:

1. A fluidized bed reactor arrangement comprising:

a bottom portion;

a roof portion;

a reaction chamber defined by at least one side wall extending between the bottom portion and the roof portion, the at least one side wall comprising a vertically extending portion having a lower end and a lower portion, which lower portion is inclined in such a manner that a cross section of the reaction chamber decreases towards the bottom portion; and a heat exchange chamber, outside of the reaction chamber, at the lower portion of the at least one side wall, the lower portion of the at least one side wall forming a partition wall between the heat exchange chamber and the reaction chamber, the heat exchange chamber extending from the partition wall to a rear wall of the heat exchange chamber, wherein the rear wall of the heat exchange chamber comprises (i) a lower portion extending to the other side, than the partition wall, of a plane extending via the vertically extending portion of the at least one side wall and (ii) an upper portion, wherein a plane extending via the upper portion of the rear wall joins for a predetermined distance from a connection of the heat exchange chamber and the lower end of the vertically extending portion of the at least one side wall with the plane extending via the vertically extending portion of the at least one side wall.

2. The fluidized bed reactor arrangement in accordance with claim 1, wherein the heat exchange chamber is entirely supported by the reaction chamber.

3. The fluidized bed reactor arrangement in accordance with claim 1, wherein the heat exchange chamber comprises end walls in connection with both edges of the rear wall thereof, which end walls extend from the connection of the heat exchange chamber and the lower end of the vertically extending portion of the at least one side wall to the bottom portion of the heat exchange chamber.

4. The fluidized bed reactor arrangement in accordance with claim 1, wherein the heat exchange chamber is horizontally arranged only to a portion of the distance between the edges of the side walls of the at least one side wall.

5. The fluidized bed reactor arrangement in accordance with claim 1, further comprising a number of heat exchange chambers between the edges of the at least one side wall.

6. The fluidized bed reactor arrangement in accordance with claim 1, wherein the rear wall of the heat exchange chamber is formed of a membrane structure and the at least one side wall of the reactor chamber is formed of a membrane structure.

7. The fluidized bed reactor arrangement in accordance with claim 6, wherein the membrane structure of the rear wall of the heat exchange chamber is connected with a feed water system of the fluidized bed reactor arrangement.

8. The fluidized bed reactor arrangement in accordance with claim 6, wherein the membrane structure of the at least one side wall is connected to an evaporator system of the fluidized bed reactor arrangement.

9. The fluidized bed reactor arrangement in accordance with claim 6, wherein a first group of tubes of the membrane structure of the at least one side wall is arranged to run from the vertically extending portion of the at least one sidewall to the lower portion of the at least one side wall and a second group of tubes of the membrane structure of the at least one side wall is arranged to run from the vertically extending portion of the least one side wall to the rear wall of the heat exchange chamber.

10. The fluidized bed reactor arrangement in accordance with claim 1, wherein the heat exchange chamber has a certain center of gravity, especially, when the heat exchange chamber contains a predetermined amount of solid material.

11. The fluidized bed reactor arrangement in accordance with claim 10, wherein the solid material is distributed in a predetermined manner and the heat exchange chamber is arranged in such a manner that the center of gravity joins with the plane.

12. The fluidized bed reactor arrangement in accordance with claim 1, wherein a length of the predetermined distance is determined such that a ratio of the length to a distance between the end walls of the heat exchange chamber is at least 0.5.

* * * * *